United States Patent Office 3,277,088
Patented Oct. 4, 1966

3,277,088
4-(TERTIARYAMINO)-2H-PYRAN-2-ONES
James C. Martin, Kingsport, Tenn., assignor to Eastman Kodak Company, Rochester, N.Y., a corporation of New Jersey
No Drawing. Filed Jan. 15, 1964, Ser. No. 337,711
13 Claims. (Cl. 260—247.2)

This application is a continuation-in-part of my copending application Serial No. 313,446, filed October 3, 1963, now abandoned.

This invention relates to organic chemistry. More particularly, this invention relates to novel chemical compounds and to novel methods for their preparation.

The novel compounds of the invention are substituted 4-(tertiaryamino)-2H-pyran-2-ones of the formula:

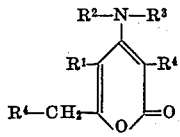

wherein each of $R^1$ and $R^4$ can be hydrogen, alkyl of 1 to 8 carbon atoms or mononuclear carbocyclic aryl; $R^2$ and $R^3$, taken singly, can be alkyl of 1 to 8 carbon atoms or mononuclear carbocyclic aryl and $R^2$ and $R^3$, taken collectively with the nitrogen atom to which they are attached, form a cyclic tertiaryamino group having from about 4 to about 7 atoms in the ring.

The substituents $R^1$ and $R^4$, when alkyl of 1 to 8 carbon atoms are typically groups such as methyl, ethyl, propyl, iso-propyl, butyl, sec-butyl, tert-butyl, pentyl, tert-pentyl, hexyl, heptyl, octyl, 2-ethylhexyl, etc. and are preferably lower alkyl. $R^1$ and $R^4$, when mononuclear carbocyclic aryl, are typically phenyl or lower alkyl substituted phenyl such as tolyl, xylyl, ethylphenyl, diethylphenyl, propylphenyl, isopropylphenyl, butylphenyl, dibutylphenyl, sec-butylphenyl, tert-butylphenyl, etc. and are preferably phenyl.

The substituents $R^2$ and $R^3$, when alkyl of 1 to 8 carbon atoms are groups such as methyl, ethyl, propyl, isopropyl, butyl, sec-butyl, tert-butyl, pentyl, tert-pentyl, hexyl, heptyl, octyl, 2-ethylhexyl, etc. and are preferably lower alkyl. When $R^2$ and $R^3$ are mononuclear carbocyclic aryl groups they are typically groups such as phenyl or lower alkyl substituted phenyl shuch as tolyl, xylyl, ethylphenyl, diethylphenyl, propylphenyl, isopropylphenyl, butylphenyl, dibutylphenyl, sec-butylphenyl, tert-butylphenyl, etc. and are preferably phenyl. The cyclic tertiaryamino groups having from about 4 to about 7 atoms in the ring, represented by $R^2$ and $R^3$ taken collectively with the nitrogen atom to which $R^2$ and $R^3$ are attached, are typically groups such as azetidino, pyrrolidino, piperidino, hexamethyleneimino, 1,3-oxazetidino, morpholino, etc. and are preferably such groups having 5 to 6 ring atoms, e.g., pyrrolidino, piperidino, morpholino, etc.

Illustrative examples of some of the compounds within the scope of the invention are shown in Table I.

TABLE I

| Name | Structure |
|---|---|
| 4-(N,N-dimethylamino)-6-methyl-2H-pyran-2-one. | (structure shown) |
| 4-(N,N-diethylamino)-5,6-dimethyl-2H-pyran-2-one. | (structure shown) |
| 4-(N,N-dipropylamino)-5-ethyl-6-methyl-2H-pyran-2-one. | (structure shown) |
| 4-(N,N-dimethylamino)-5-(sec-butyl)-6-methyl-2H-pyran-2-one. | (structure shown) |
| 4-(N-methyl,N-ethylamino)-5-phenyl-6-methyl-2H-pyran-2-one. | (structure shown) |
| 4-(N,N-dibutylamino)-5-(2-ethylhexyl)-6-methyl-2H-pyran-2-one. | (structure shown) |

| Name | Structure |
|---|---|
| 4-(N,N-diphenylamino)-5-hexyl-6-methyl-2H-pyran-2-one. | |
| 4-(N,N-dioctylamino)-5-pentyl-6-methyl-2H-pyran-2-one. | |
| 4-(N-tolyl,N-xylylamino)-5-phenyl-6-methyl-2H-pyran-2-one. | |
| 4-(N-phenyl,N-ethylamino)-5-(tert-butyl)-6-methyl-2H-pyran-2-one. | |
| 4-[N,N-di(tert-butyl)amino]-6-methyl-2H-pyran-2-one. | |
| 4-(N,N-dipentylamino)-6-methyl-2H-pyran-2-one. | |
| 4-[N,N-di(2-ethylhexyl)amino]-5-(tert-butyl)-6-methyl-2H-pyran-2-one. | |
| 4-(morpholino)-6-methyl-2H-pyran-2-one. | |
| 4-(morpholino)-5,6-dimethyl-2H-pyran-2-one. | |

| Name | Structure |
|---|---|
| 4-(pyrrolidino)-5-phenyl-6-methyl-2H-pyran-2-one. | (structure) |
| 4-(piperidino)-5-octyl-6-methyl-2H-pyran-2-one. | (structure) |
| 4-(pyrrolidino)-6-methyl-2H-pyran-2-one. | (structure) |
| 4-(piperidino)-6-methyl-2H-pyran-2-one. | (structure) |
| 4-(piperidino)-5-tolyl-6-methyl-2H-pyran-2-one. | (structure) |
| 4-(N,N-dimethylamino)-6-ethyl-3-methyl-2H-pyran-2-one. | (structure) |
| 4-(N,N-diethylamino)-3-butyl-6-pentyl-2H-pyran-2-one. | (structure) |
| 4-(morpholino)-6-nonyl-3-octyl-2H-pyran-2-one. | (structure) |

| Name | Structure |
|---|---|
| 4-(piperidino)-5-methyl-6-benzyl-3-phenyl-2H-pyran-2-one. | 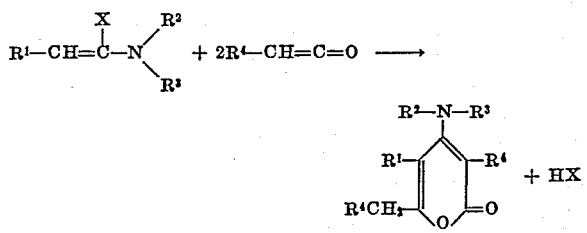 |

The compounds of the invention can be prepared by the process of the invention, which comprises combining a ketene O,N-acetal or a ketene aminal with ketene or an aldoketene.

The process of the invention can be represented by the following equation:

 + 2R⁴—CH=C=O ⟶

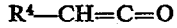 + HX wherein X is a tertiaryamino substituent of the formula:

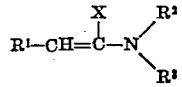

or a substituent of the formula: —OR⁵; $R^1$, $R^3$ and $R^4$ have the meanings previously discussed and $R^5$ is lower alkyl or mononuclear carbocyclic aryl.

The ketenes useful in the process of the invention, i.e., ketene and aldoketenes, can be represented by the formula:

$$R^4—CH=C=O$$

Typical of the ketenes which are useful in the process of the invention are ketene, methylketene, ethylketene, propylketene, isopropylketene, butylketene, sec-butylketene, heptylketene, phenylketene, tolylketene, xylylketene, etc. These ketenes can be prepared by the methods disclosed by Hanford and Sauer at III Organic Reactions 124, John Wiley and Sons, N.Y. (1946).

The reactants of the formula:

are ketene O,N-acetals when X has the formula —OR⁵ and ketene aminals when X is

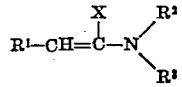

Some of the ketene O,N acetals useful in the process of the invention include 1-ethoxy-N,N-dimethylvinylamine;
1-(1-methoxyvinyl)piperidine;
1-(1-butoxyvinyl)morpholine;
N,N-dibutyl-1-butoxyvinylamine;
1-ethoxy-N,N-dimethyl-2-phenylvinylamine;
1-ethoxy-N,N-dimethyl-1-butenylamine;
1-ethoxy-N,N-dimethyl-1-decenylamine;
1-ethoxy-N-methyl-N-phenylvinylamine, etc.

These compounds can be prepared by the methods disclosed and referred to by Meerwin et al., in Ann. 641, 9 (1961).

The ketene aminals useful in the process of the invention can be prepared by the methods disclosed and referred to by Baganz and Domaschke in Chem. Ber., 95, 2095 (1962). Examples of useful ketene aminals include 4,4'-vinylidenedimorpholine;
1,1'-vinylidenedipiperidine;
N,N'-vinylidenebis(dimethylamine);
1,1'-vinylidenedipyrrolidine;
N,N'-vinylidenebis(N-methylaniline);
4,4'-propenylidenedimorpholine;
4,4'-(1-butenylidene)dimorpholine;
4,4'-(1-isobutenylidene)dimorpholine;
N,N'-vinylidenebis(dibutylamine); etc.

The process of the invention is conveniently carried out by combining the reactants at a temperature of about —40° C. to about 200° C. Higher temperatures in this range are preferred for the less reactive of the reactants whereas lower temperatures in the range are preferred for the more reactive reactants. In general, the reactivity of the reactants decreases as the number of carbon atoms in the substituents $R^1$, $R^2$, $R^3$, $R^4$ and $R^5$ increases. A preferred temperature range is from about —20° C. to about 180° C.

The reaction can be conveniently carried out at atmospheric pressure. However higher or lower pressures can be used if desired.

The process of the invention can be conducted with or without an inert solvent. In general however, it is preferred to use such a solvent in the process. The inert solvent should dissolve both of the reactants, be inert to the reactants and be liquid at reaction temperature and pressure. Useful solvents include ethers, esters, nitro compounds, nitriles, dialkylamides, cyclic carbonates, etc. Polar solvents are especially preferred because of the higher yields generally obtained when they are employed. Examples of especially useful polar solvents include diethyl ether, acetonitrile, tetrahydrofuran, chloroform, ethyl acetate, etc.

The proportion of the reactants is not critical. However, it is generally preferred to use at least a stoichiometric equivalent of the ketene reactant, i.e., at least 2 moles of ketene reactant per mole of ketene O,N-acetal or ketene aminal. The use of 2 to about 4 moles of ketene reactant per mole of compound of the formula:

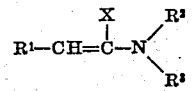

is especially advantageous.

The reaction can be conducted by simultaneously adding the reactants to an inert solvent or by adding the ketene reactant to the reactant of the formula:

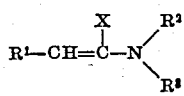

Addition of the ketene O,N-acetal or the ketene aminal to the ketene reactant should be avoided in order to inhibit the formation of excessive amounts of ketene polymers.

The ketene reactant can be used as a pure material or generated in situ, e.g., from an acyl chloride by the method of Opitz and Kleeman, Ang. Chem. Internat. Edit., 1, 51 (1962).

The following examples illustrate the process and the novel compounds of the invention.

Example 1

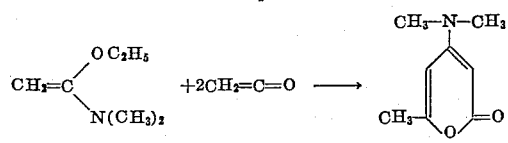

To a solution of 40 g. (0.35 mole) of 1-ethoxy-N,N-dimethylvinylamine in 200 ml. of ether is added 17.2 g. (0.42 mole) of ketene at 0–5°. The reaction solution is stirred at room temperature for 3 hrs. A yellow solid precipitates. This is removed by filtration and recrystallized from toluene to give 16.4 g. of 4-dimethylamino-6-methyl-2H-pyran-2-one, M.P. 130–131°.

*Analysis.*—Calcd. for $C_8H_{11}NO_2$: C, 62.7; H, 7.2; N, 9.2; mol. wt., 153. Found: C, 62.9; H, 7.5; N, 9.2; mol. wt. (by B.P. elevation in acetone), 152.

The n.m.r. spectrum of this material is in agreement with the structure assigned. It shows the following peaks (measured at 40 megacycles using a Varian V4300B in c.p.s relative to water as an external standard):

$$-31, \,\,\mathrm{\underset{/}{\overset{\backslash}{C}}=C\underset{\backslash}{\overset{H}{/}}} \,\, ; \,\, 26, \,\, -\mathrm{N-\underset{|}{C}=C\underset{\backslash}{\overset{H}{/}}}$$

$$90, \,\, -\mathrm{N(CH_3)_2}; \,\, 122, \,\, \mathrm{\underset{/}{\overset{\backslash}{C}}=C-CH_3}$$

The relative peak areas are in agreement with these assignments.

Example 2

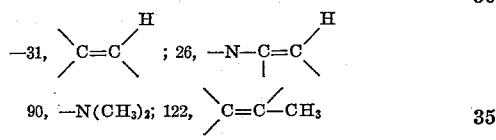

To a solution of 14.3 g. (0.1 mole) of 1-ethoxy-N,N-dimethyl-1-butenylamine in 75 ml. of acetonitrile is added 12.6 g. (0.3 mole) of ketene. The reaction temperature is kept at 20–30° and stirring is continued for 2 hrs. Evaporation of the reaction solution gives 21.4 g. of crude, partially crystalline residue. After recrystallization from a mixture of toluene and hexane, 12.6 g. of 4-dimethyl-amino-5-ethyl-6-methyl-2H-pyran-2-one, M.P. 60–61°, is isolated.

Example 3

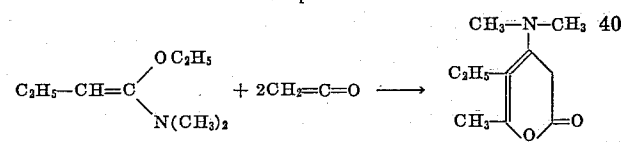

Under the general conditions of Example 1, 14.3 g. (0.1 mole) of 1-butoxy-N,N-dimethylvinylamine, 12.6 g. (0.3 mole) of ketene and 100 ml. of ethyl acetate give 12.2 g. (80%) of 4-dimethylamino-6-methyl-2H-pyran-2-one, M.P. 130–131°. The infrared spectrum is identical to that of the material of Example 1.

Example 4

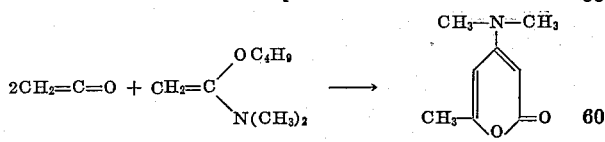

Under the general conditions of Example 1, 40 g. (0.35 mole) of 1-ethoxy-N,N-dimethylvinylamine, 46.2 g. (1.1 mole) of ketene and 200 ml. of acetonitrile give 46 g. of 4-dimethylamino-6-methyl-2H-pyran-2-one, identical to that prepared in Example 1.

Example 5

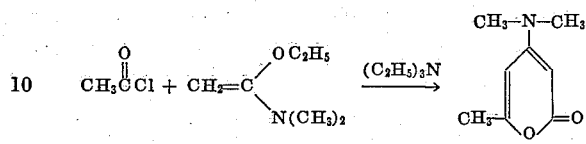

To a stirred solution of 11.5 g. (0.1 mole) of 1-ethoxy-N,N-dimethylvinylamine and 30.6 g. (0.302 mole) of triethylamine in 75 ml. of tetrahydrofuran under nitrogen is added slowly a solution of 23.5 g. (0.3 mole) of acetyl chloride in 75 ml. of tetrahydrofuran. The temperature is kept at 5–10° during the addition and later at 25–30° for 2 hrs. The solid that precipitates (triethylamine hydrochloride) is removed by filtration. There is recovered from the tetrahydrofuran solution 6.2 g. 4-dimethylamino-6-methyl-2H-pyran-2-one identical to that prepared according to Example 1.

Example 6

Under the general conditions of Example 1, the following ketene O,N-acetals combine with ketene to give the products shown:

| Ketene O,N-Acetal | Product |
|---|---|
| 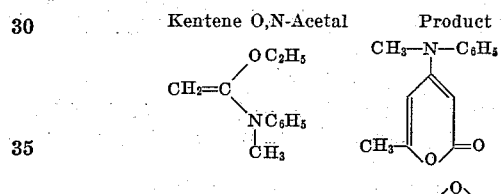 | |
| 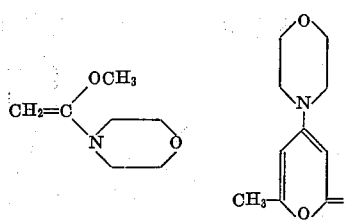 | |

Example 7

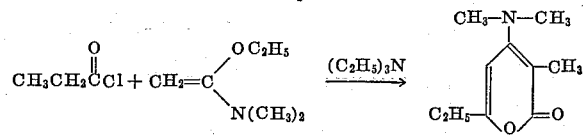

Under the same general conditions of Example 5, 11.5 g. (0.1 mole) of 1-ethoxy-N,N-dimethylvinylamine and 30.6 g. (0.302 mole) of triethylamine in 100 ml. of tetrahydrofuran and 27.8 g. (0.3 mole) of propionyl chloride in 50 ml. of tetrahydrofuran give 7.3 g. of 4-dimethyl-amino-6-ethyl-3-methyl-2H-pyran-2-one, M.P. 78–81° (from benzene).

*Analysis.*—Calcd. for $C_{10}H_{15}NO_2$: N, 7.7. Found: N, 7.6.

Example 8

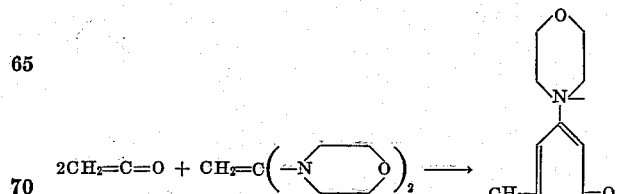

To a stirred solution of 62 g. (0.31 mole) of 4,4'-vinylidenedimorpholine in 250 ml. of ether is added 35 g. (0.83 mole) of ketene. The reaction temperature is controlled around 25° with a wet-ice bath.

The resulting crystalline material is removed by filtration (51 g.) and recrystallized twice from benzene and twice from ethanol to give 16 g. of high purity 6-methyl-4-morpholino-2H-pyran-2-one, M.P. 177–179°.

*Analysis.*—Calcd. for C₁₀H₁₃NO₃: C, 61.6; H, 6.7; N, 7.2; mol. wt., 195. Found: C, 61.6; H, 6.6; N, 7.1; mol. wt., 199 (B.P. elevation in ethanol).

Infrared maxima (KBr): 5.9, 6.12 and 6.7μ. The n.m.r. spectrum (CHCl₃) showed a singlet at 2.17 (methyl protons), a multiplet centered at 3.30 and 3.74 (protons of morpholine group), broad peaks centered at 5.08 and 5.84 (olefinic protons). The n.m.r. spectra were recorded on a Varian A-60 instrument at 60 mc. Values reported are parts per million referred to tetramethylsilane as an internal standard.

Example 9

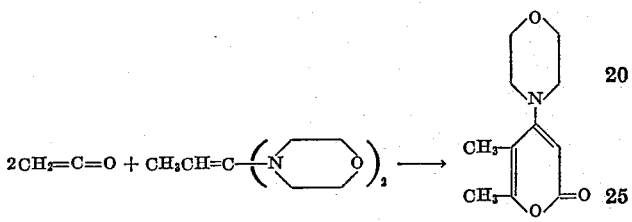

Under conditions of Example 8, 21.2 g. (0.1 mole) of 4,4'-propenylidenedimorpholine in 150 ml. of chloroform and 8.4 g. (0.2 mole) of ketene give a good yield of 5,6-dimethyl-4-morpholino-2H-pyran-2-one, M.P. 152–154°.

Example 10

Under the general conditions of Example 8, the following ketene aminals combine with ketene to give the compounds shown;

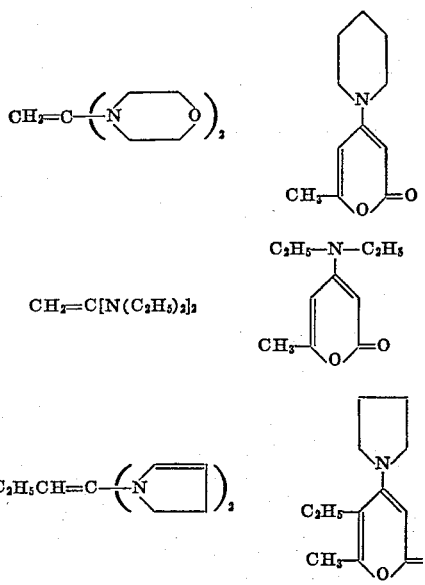

Ketone Aminals — Product

Example 11

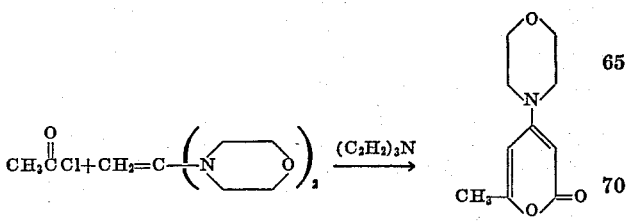

To a stirred solution of 19.8 g. (0.1 mole) of 4,4'-vinylidene-dimorpholine and 30.6 g. (0.302 mole) of triethylamine in 75 ml. of tetrahydrofuran under nitrogen is added slowly a solution of 23.5 g. (0.3 mole) of acetyl chloride in 75 ml. of tetrahydrofuran. The temperature is kept at 5–7° during the addition and later at 25–30° for 2 hrs. The solid precipitate is removed by filtration and weighs 42 g. Concentration of the tetrahydrofuran solution yields 24 g. of a dark solid. This solid is washed repeatedly with ethanol to give 2.0 g. of 6-methyl-4-morpholino-2H-pyran-2-one, M.P. 176–179°.

Example 12

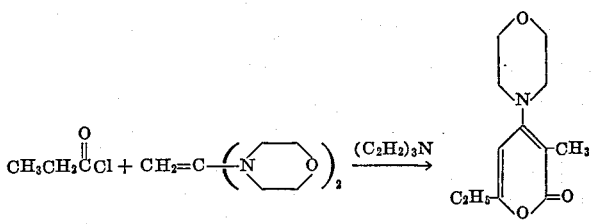

Under the general conditions of Example 11, 4,4'-vinylidene-dimorpholine, propionyl chloride and triethylamine in tetrahydrofuran give 6-ethyl-3-methyl-4-morpholino-2H-pyran-2-one.

The following examples illustrate the correctness of the assigned 4-(tertiaryamino)-2H-pyran-2-one structure of the novel compounds of my invention and illustrate the use of the novel compounds in the preparation of useful diols.

Example 13

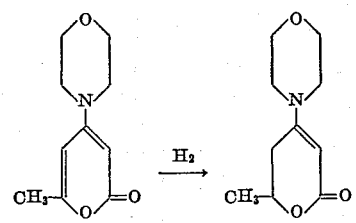

A solution of 19.5 g. (0.1 mole) of 6-methyl-4-morpholino-2H-pyran-2-one in 530 ml. of methyl alcohol was hydrogenated over 4 g. of 5% ruthenium on carbon in a magnetically stirred pressure bottle at room temperature for 8 hrs. at 40 p.s.i. The catalyst was removed by filtration and the solvent was evaporated under vacuum to give a solid residue. Recrystallization from ethyl alcohol gave 14.0 g. (71%) of 6-methyl-4-morpholino-5,6-dihydro-2H-pyran-2-one, M.P. 119–121°.

*Analysis.*—Calcd. for C₁₀H₁₅NO₃: C, 60.9; H, 7.7; N, 7.1. Found: C, 61.1; H, 7.7; N, 6.9.

Infrared maxima (KBr): 6.03 and 6.35μ. The n.m.r. spectrum (CHCl₃) showed a doublet centered at 1.38 (methyl protons), a multiplet centered at 2.55 (methylene protons), multiplets centered at 3.31 and 3.79 (protons of morpholine group), a multiplet centered at 4.42 (methine proton), and a broad single peak at 4.88 (olefinic proton).

Example 14

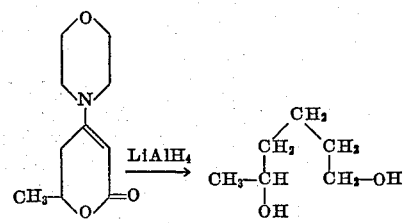

A mixture of 5.0 g. (0.025 mole) of 6-methyl-4-morpholino-5,6-dihydro-2H-pyran-2-one, 2.6 g. (0.07 mole) of lithium aluminum hydride and 150 ml. of tetrahydrofuran was stirred for 15 hrs. at 25°. The reaction mixture was hydrolyzed by succesive addition of 2.6 ml. of water, 1.95 g. of 20% sodium hydroxide solution and 9.1 ml. of water. The mixture was filtered and evaporated under vacuum to give 2.9 g. of a viscous oil. This material was a mixture rich in one component, which was isolated by gas-liquid-chromatography and identified as 1,5-hexanediol, $n_D^{20}$ 1.4535.

Analysis.—Calcd. for $C_6H_{14}O_2$: C, 61.0; H, 11.9. Found: C, 61.3; H, 12.0.

Infrared maxima (smear): 3.0, 8.80, 8.92, 9.10, 9.30 and 9.49μ. The n.m.r. spectrum (neat) showed a doublet centered at 1.15 (methyl protons), a broad peak centered at 1.46 (protons of three adjacent methylene groups) a broad peak centered at 3.58 (methine proton and protons of methylene group adjacent to oxygen), and a singlet at 5.12 (protons of hydroxy groups).

The novel compounds of the invention are useful intermediates in the preparation of pharmaceutical compositions, dye intermediates and reagents.

The following examples illustrate the use of the novel compounds of the invention in the preparation of 3,5-dimethylpyrazole, a compound that is useful in the quantitive analysis procedures described by Hein, Ind. Eng. Chem., Anal. Ed., 2, 38 (1930) and in the preparation of acetylacetone which is a useful reagent for determining the presence of ferric iron.

*Example 15*

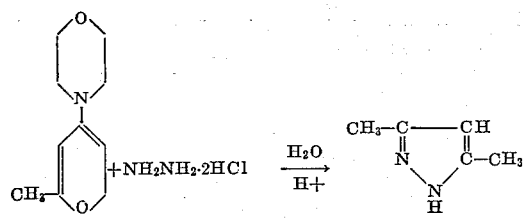

A mixture of 10 g. (0.051 mole) of 6-methyl-4-morpholino-2H-pyran-2-one and 5.35 g. (0.051 mole) of hydrazine dihydrochloride in 70 ml. of a 10% hydrochloric acid solution is stirred at 90–100° for 6 hrs. The cooled solution is made alkaline with 20% aqueous sodium hydroxide and extracted with ethyl ether. After drying over anhydrous magnesium sulfate, the ether solution is distilled through a small Vigreux column to give 3,5-dimethylpyrazole, B.P. 218–222°. The infrared spectrum of this material is identical to that of an authentic sample of 3,5-dimethylpyrazole.

*Example 16*

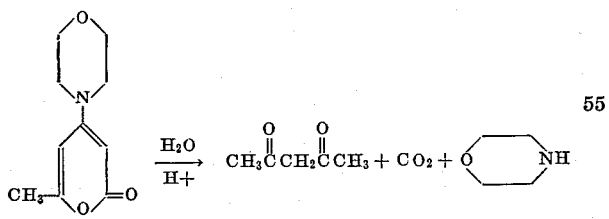

A stirred mixture of 10 g. of 6-methyl-4-morpholino-2H-pyran-2-one and 50 ml. of a 10% hydrochloric acid solution is heated at 60–75° for 1 hr. The aqueous solution is extracted with ether. Distillation of the ether layer through a small Vigreux column gives 2.0 g. of acetylacetone, B.P. 48° (35 mm.). The infrared spectrum of this material was identical to that of an authentic sample of acetylacetone.

The invention has been described in considerable detail with particular reference to certain preferred embodiments thereof, but it will be understood that variations and modifications can be effected within the spirit and scope of the invention as described hereinbefore and as defined in the appended claims.

I claim:
1. A compound of the formula:

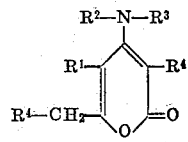

wherein each of $R^1$ and $R^4$ is selected from the group consisting of:
  (a) hydrogen,
  (b) lower alkyl,
  (c) phenyl and
  (d) lower alkyl phenyl;
wherein each of $R^2$ and $R^3$, taken singly, is selected from the group consisting of:
  (a) lower alkyl,
  (b) phenyl and
  (c) lower alkyl phenyl; and
wherein $R^2$ and $R^3$, taken collectively with the nitrogen atom to which they are attached, form a cyclic amino group selected from
  (a) azetidino
  (b) pyrrolidino
  (c) piperidino
  (d) hexamethyleneimino
  (e) 1,3-oxazetidino or
  (f) morpholino.

2. The compound of the formula:

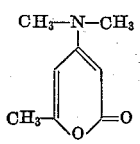

3. The compound of the formula:

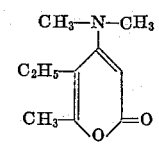

4. The compound of the formula:

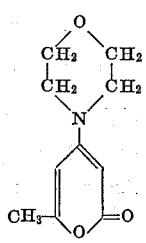

5. The compound of the formula:

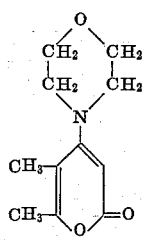

6. The compound of the formula:

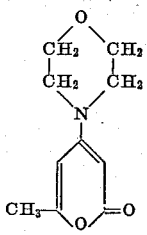

7. The method of preparing a compound of the formula:

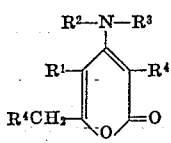

which comprises combining a ketene of the formula:

$$R^4-CH=C=O$$

with a compound of the formula:

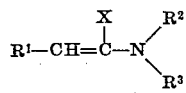

at a temperature of about −40° C. to about 200; wherein X is selected from the group consisting of:

(a) $\quad -OR^5$ and (b) 

wherein each of $R^1$ and $R^4$ is selected from the group consisting of:
 (a) hydrogen,
 (b) alkyl of 1 to 8 carbons and
 (c) mononuclear carbocyclic aryl;
wherein each of $R^2$ and $R^3$, taken singly, is selected from the group consisting of:
 (a) alkyl of 1 to 8 carbons and
 (b) mononuclear carbocyclic aryl; and
wherein $R^2$ and $R^3$, taken collectively with the nitrogen atom to which they are attached, from a cyclic tertiary amino group having from about 4 to about 7 carbon atoms in the ring; and wherein $R^5$ is selected from the group consisting of:
 (a) lower alkyl and
 (b) mononuclear carbocyclic aryl.

8. The method of preparing a compound of the formula:

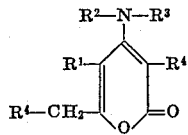

which comprises combining a ketene of the formula:

$$R^4-CH=C=O$$

with a compound of the formula:

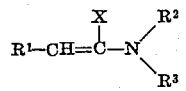

at a temperature of about −20° C. to about 180° C. in the presence of an inert polar solvent; wherein X is selected from the group consisting of:

(a) $\quad -OR^5$ and (b) 

wherein each of $R^1$ and $R^4$ is selected from the group consisting of:
 (a) hydrogen,
 (b) lower alkyl,
 (c) phenyl and
 (d) lower alkyl substituted phenyl;
wherein each of $R^2$ and $R^3$, taken singly, is selected from the group consisting of:
 (a) lower alkyl,
 (b) phenyl and
 (c) lower alkyl substituted phenyl; and
wherein $R^2$ and $R^3$, taken collectively with the nitrogen atom to which they are attached, form a cyclic tertiary amino group having from about 5 to about 6 atoms in the ring; and wherein $R^5$ is selected from the group consisting of:
 (a) lower alkyl and
 (b) mononuclear carbocyclic aryl.

9. The process of preparing the compound of the formula:

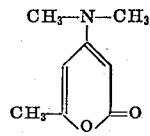

which comprises combining ketene with a compound of the formula:

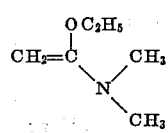

at a temperature of about −20° C. to about 180° C. in the presence of a polar solvent.

10. The process of preparing the compound of the formula:

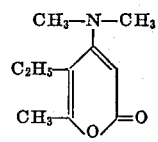

which comprises combining ketene with a compound of the formula:

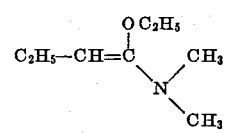

at a temperature of about −20° C. to about 180° C. in the presence of a polar solvent.

11. The process of preparing the compound of the formula:

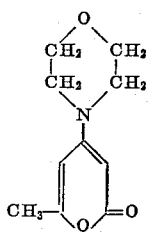

which comprises combining ketene with a compound of the formula:

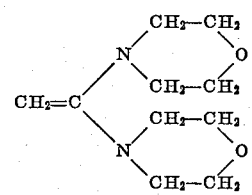

at a temperature of about −20° C. to about 180° C. in the presence of a polar solvent.

12. The process of preparing the compound of the formula:

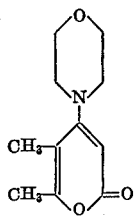

which comprises combining ketene with a compound of the formula:

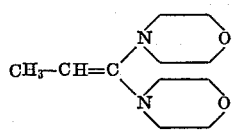

at a temperature of about −20° C. to about 180° C. in the presence of a polar solvent.

13. The process of preparing the compound of the formula:

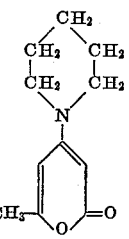

which comprises combining ketene with a compound of the formula:

$$CH_2=C\begin{matrix}N\\N\end{matrix}$$

at a temperature of about −20° C. to about 180° C. in the presence of a polar solvent.

No references cited.

ALEX MAZEL, *Primary Examiner.*

HENRY R. JILES, *Examiner.*

J. TOVAR, *Assistant Examiner.*